US008145329B2

(12) United States Patent
Pekar et al.

(10) Patent No.: US 8,145,329 B2
(45) Date of Patent: Mar. 27, 2012

(54) METHOD AND SYSTEM FOR COMBINING FEEDBACK AND FEEDFORWARD IN MODEL PREDICTIVE CONTROL

(75) Inventors: Jaroslav Pekar, Pacov (CZ); Greg Strewart, North Vancouver (CA); Dejan Kihas, Burnaby (CA); Francesco Borrelli, Berkeley, CA (US)

(73) Assignee: Honeywell International Inc., Morristown, NJ (US)

( * ) Notice: Subject to any disclaimer, the term of this patent is extended or adjusted under 35 U.S.C. 154(b) by 322 days.

(21) Appl. No.: 12/476,517

(22) Filed: Jun. 2, 2009

(65) Prior Publication Data

US 2010/0305719 A1  Dec. 2, 2010

(51) Int. Cl.
  *G05B 13/02* (2006.01)
(52) U.S. Cl. ............................................. 700/45; 700/44
(58) Field of Classification Search .................... 700/44, 700/45
  See application file for complete search history.

(56) References Cited

U.S. PATENT DOCUMENTS

| 5,561,599 A | 10/1996 | Lu ................................. 364/164 |
| 7,337,022 B2 | 2/2008 | Wojsznis et al. ................ 700/36 |
| 7,415,389 B2 | 8/2008 | Stewart et al. ................ 702/185 |
| 2004/0256069 A1* | 12/2004 | Saucedo et al. ................ 162/158 |
| 2007/0050053 A1 | 3/2007 | Cutler ............................. 700/34 |
| 2008/0188957 A1 | 8/2008 | Cutler ............................. 700/39 |
| 2010/0087933 A1* | 4/2010 | Cheng ............................. 700/30 |

OTHER PUBLICATIONS

Qin, S. J., Badgwell, Thomas A.; A Survey of Industrial Model Predictive Control Technology; www.sciencedirect.com; Control Engineering Practice 11 (2003) 733-764.

\* cited by examiner

*Primary Examiner* — Ryan Jarrett
(74) *Attorney, Agent, or Firm* — Seager Tufte & Wickhem LLC

(57) ABSTRACT

A method and system for combining a feedback control and a feedforward control in a linear MPC to minimize effect of model uncertainty. An externally computed feedforward signal, which is more accurate and reliable, can be utilized in association with the MPC, A steady state relation between system parameters can be determined in order to compute the feedforward signal for a set of actuators associated with a non-linear system. A feedback MPC controller can then be designed. A state observer can be configured as an unknown input observer to estimate the effect of the feedforward signal. A strategy for manipulating the constraints of the MPC feedback signal can be implemented. A resulting control action for the actuators can be provided as a sum of corresponding feedback and feedforward signal while ensuring the constraints satisfaction.

20 Claims, 3 Drawing Sheets

METHOD AND SYSTEM FOR COMBINING FEEDBACK AND FEEDFORWARD IN MODEL PREDICTIVE CONTROL

TECHNICAL FIELD

Embodiments are generally related to MPC (Model-based Predictive Control) systems and methods. Embodiments are also related to feedback and feedforward control in the context of MPC applications.

BACKGROUND OF THE INVENTION

Model-based Predictive Control, also known as "MPC", is a common approach utilized in advanced industrial process control applications. MPC typically involves the use of a controller that utilizes a mathematical model of the process to predict the future behavior of the control system and formulate a control problem as a constrained optimization. The accuracy of the internal process model is crucial to control performance.

MPC is thus a standard control and optimization technique utilized in process control applications such as, for example, petrochemical industry, power and industrial energy, power train control applications in diesel engines, turbocharger control, and so forth. The acronym "MPC" generally refers to a class of computer algorithms that utilize an internal mathematical model of the controlled system and an optimization algorithm to compute optimal future trajectories of system inputs for control action. MPC is usually implemented in the context of the so-called "Receding Horizon" scheme. In typical receding horizon control schemes, the controller calculates future trajectories of system inputs at each sampling period. The first control action, however, is generally applied to the system and new future trajectories are computed in the next sampling period after obtaining new measurements. The receding horizon scheme introduces a standard feedback for the MPC controller.

The MPC may include, for example, a model of the dynamic process of engine operation and provide predictive control signals to the engine subject to constraints in control variables and measured output variables. Such models may be static and/or dynamic, linear or nonlinear, depending on the application. In some cases, the models may produce one or more output signals y(t) from one or more input signals u(t). A dynamic model typically contains a static model plus information about the time response of the system. Thus, a dynamic model is often of higher fidelity than a static model.

To provide a simple example in mathematical terms, a linear dynamic model may have the following form:

$$Y(t) = B0*u(t) + B1*u(t-1) + \ldots + Bn*u(t-n) + A1*y(t-1) + \ldots + Am*y(t-m)$$

wherein B0 ... Bn, and A1 ... Am are constant matrices.

In a dynamic model, y(t) which is the output at time t, is based on the current input u(t), one or more past inputs u(t−1), ..., u(t−n), and also on one or more past outputs y(t−1) ... y(t−m). A static model is a special case where, for example, the matrices are B1= ... =Bn=0, and A1= ... = Am=0, which can be expressed by the simpler relationship: y(t)=B0 u(t).

A static model can be shown as a simple matrix multiplier. A static model typically has no "memory" of the inputs u(t−1), u(t−2) ... or outputs y(t−1) ... etc. As a result, a static model can be simpler, but may be less powerful in modeling some dynamic system parameters.

A continuous-time model of a nonlinear dynamical system may have the general form:

$$\dot{x}(t) = f(x(t), u(t))$$

$$y(t) = h(x(t), u(t))$$

For a turbocharged diesel system, the system dynamics can be relatively complicated and several of the interactions may have characteristics known as "non-minimum phase". This is a dynamic response where the output y(t), when exposed to a step in input u(t), will initially move in one direction and then turn around and move towards its steady state in the opposite direction. In some cases, these dynamics may be important for optimal operation of the control system. Thus, dynamic models are often preferred, at least when modeling some control parameters.

In one example, the MPC may include a multivariable model that models the effect of changes in one or more actuators of the plant and the multivariable controller may then control the actuators to produce a desired response in the two or more parameters. Likewise, the model may, in some cases, model the effects of simultaneous changes in two or more actuators on each of one or more plant parameters and the multivariable controller may control the actuators to produce a desired response in each of the one or more parameters.

For example, an illustrative state-space model of a linear discrete time dynamical system may be represented by using equations of the form:

$$x(t+1) = Ax(t) + Bu(t)$$

$$y(t) = Cx(t)$$

The model predictive algorithm involves solving the optimization problem:

$$u(k) = \arg\min \{J\}$$

wherein the function J is given by, $$J = \hat{x}(t+N_y|t)^T P \hat{x}(t+N_y|t) + \sum_{k=0}^{N_y-1} \left[ \begin{array}{c} \hat{x}(t+k|t)^T Q \hat{x}(t+k|t) + \\ u(t+k)^T R u(t+k) \end{array} \right]$$

Subject to Constraints $$y_{min} \leq \hat{y}(t+k|t) \leq y_{max}$$

$$u_{min} \leq u(t+k) \leq u_{max}$$

$$x(t|t) = x(t)$$

$$\hat{x}(t+k+1|t) = A\hat{x}(t+k|t) + Bu(t+k)$$

$$\hat{y}(t+k|t) = C\hat{x}(t+k|t)$$

In some embodiments, this is transformed into a Quadratic Programming (QP) problem and solved with standard or customized tools. The variable "y(k)" contains the sensor measurements. The variables ŷ(k+t|t) denote the outputs of the system predicted at time "t+k" when the measurements "y(t)" are available. They are used in the model predictive controller to choose the sequence of inputs which yields the "best" (according to performance index J) predicted sequence of outputs.

The variables "u(k)" can be produced by optimizing J and, in some cases, are used for the actuator set points. The variable "x(k)" is a variable representing an internal state of the dynamical state space model of the system. The variable x̂(t+k|t) indicates the predicted version of the state variable k discrete time steps into the future and is used in the model predictive controller to optimize the future values of the system.

The variables $y_{min}$ and $y_{max}$ are constraints and indicate the minimum and maximum values that the system predicted measurements $\hat{y}(k)$ are permitted to attain. These often correspond to hard limits on the closed-loop behavior in the control system.

The variables $u_{min}$ and $u_{max}$ are also constraints and indicate the minimum and maximum values that the system actuators $\hat{u}(k)$ are permitted to attain, often corresponding to physical limitations on the actuators. Like above, in some cases and depending on the circumstances, only a minimum $u_{min}$ or maximum $u_{max}$ constraint may be provided. Also, some or all of the constraints (e.g. $y_{min}$, $y_{max}$, $u_{min}$, $u_{max}$) may vary in time, depending on the current operating conditions. The constant matrices P, Q, R are often positive definite matrices used to set a penalty on the optimization of the respective variables. These are used in practice to "tune" the closed-loop response of the system.

Various control techniques and approaches have been implemented to utilize a feedforward control in addition to the conventional feedback control system for the purpose of improving overall control performance—both for MPC and non-MPC control approaches. In practice, due to the inherent nonlinearities present in almost all real world devices, control systems are almost always nonlinear which may cause considerable degradation of resulting performance, or even instability, of the control system in some situations, particularly if a linear MPC control strategy is utilized. In such a case, the linear models may not be accurate and some technique must be implemented to handle such model uncertainties.

The majority of prior art process control techniques for implementing feedforward control with respect to a conventional feedback control system are insufficient to prevent the feedback control from diverging from its desired operating point and can significantly degrade the overall control performance. For example, in many cases the feedback control is designed to operate in a neighborhood of a desired operating point and the corresponding plant models are valid only in that neighborhood as they are often linear approximations to the nonlinear plant at the desired operating point. In such a case, if the controller steers the system away from the desired operating point, the feedback control may result in an unstable closed-loop which is unable to recover to the desired operating point—thus leading to a serious failure of the control system. Hence, in the absence of suitable protection from system nonlinear effects, the control system's closed-loop performance may be degraded or, in the worst case, the stability of the control loop can be lost.

The linear MPC technology can be configured to compute the feedforward signal in a very efficient way ("system dynamic inversion"). Typically, all measured disturbance signals affecting the system may be included into the linear model which is used for MPC control design. Then, the MPC controller ensures the optimal control action including the combination of feedback and feedforward parts. The controlled systems, however, are non-linear and the linear models may be inaccurate so significantly that the resulting performances may not be acceptable.

Based on the foregoing, it is believed that a need exists for an improved method and system for combining a feedforward and a feedback control in the context of MPC to minimize the effect of model uncertainty particularly in nonlinear plants. Such an improved method and system is described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved MPC technology for nonlinear systems.

It is another aspect of the present invention to provide for an improved method for integrating a feedforward control into a feedback model-based predictive control system.

The aforementioned aspects and other objectives and advantages can now be achieved as described herein. A method and system for combining a feedback control and a feedforward control in a linear MPC to minimize effect of uncertainty is disclosed. An externally computed feedforward signal, which is more accurate and reliable, can be utilized in association with the MPC. Such an approach can be implemented as a software module as a part of a control system where the control system is based on a model predictive control technology.

A steady state relation between system parameters can be determined in order to compute the steady state feedforward signal for a set of actuators associated with a non-linear system. A feedback linear MPC controller can then be designed which does not include the parameters and variables that parameterize the feedforward signals as measured disturbances in the MPC model. Instead, the linear model utilized by MPC is the linearization around the trajectory defined by the feedforward signal. A state observer can be configured as an unknown input observer to estimate the effect of the feedforward signal. A strategy for manipulating the constraints ($u_{min}$, $u_{max}$, $y_{min}$, $y_{max}$) of the MPC feedback signal can be implemented. A resulting control action for the actuators can be configured as a sum of corresponding feedback and feedforward signal. The steady state relations enable computation of accurate feedforward signals for the system steady state. Additionally, the constraints for the feedback portion can be computed in such a way that the feedforward signal dominates in all hard situations when the model uncertainty can cause unacceptable performances of the feedback portion by maintaining the control system in a neighborhood of the desired operating point.

The unknown input observer can be configured so that the feedforward signals can be estimated as unknown disturbances. Furthermore, the feedforward control signal can be improved by utilizing an appropriate dynamic filter to achieve a better transient response of the control system. Note that the unknown input observer can be implemented as a part of the system state observer such as, for example, Kalman filter. Such an approach significantly improves the performances of the model predictive controller. The output of the functions of the strategy for manipulating the constraints is directly the limits for the feedback portion of the control action so that the resulting combination of the feedback and the feedforward control does not violate the prescribed time-varying constraints of the actuator.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
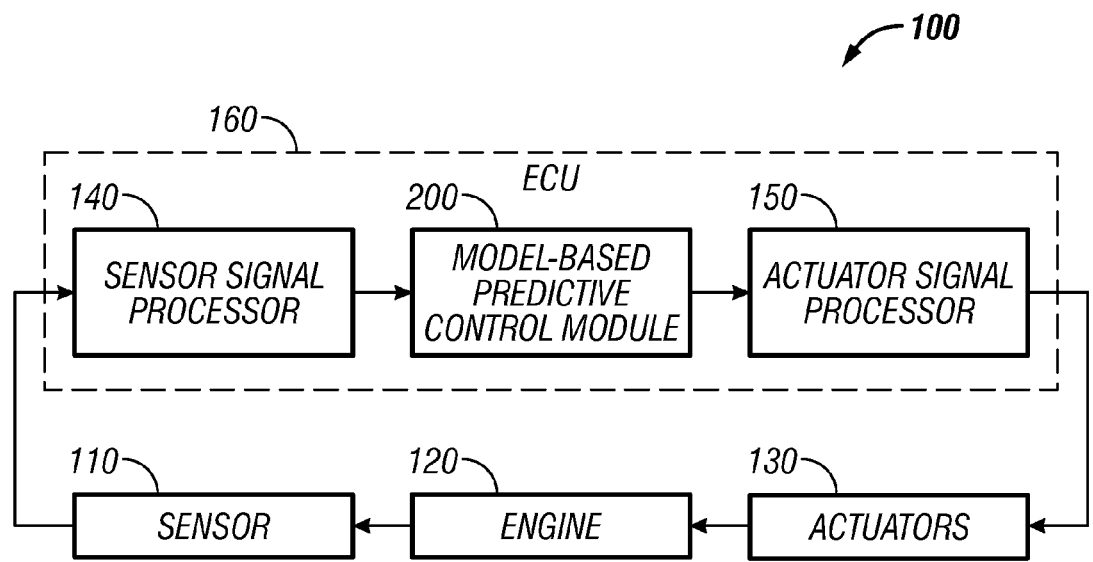
FIG. 1 illustrates a schematic block diagram of a general control system associated with an optimal MPC controller utilizing a feedback and a feedforward control in which embodiments of the present invention may be implemented.

FIG. 1 illustrates a schematic block diagram of a general control system 100 associated with an optimal MPC control module 200 utilizing a feedback and a feedforward control in which embodiments of the present invention may be implemented. The control system 100 can be adapted for use with MPC control module 200 for controlling, for example, an automotive system. MPC control module 200 can include, for example, a model of the dynamic operation process of an automotive system. The control system 100 can also be configured to include an ECU (Electronic Control Unit) 160 connected to an engine 120. The ECU 160 may include a digital computer that controls the engine 120 (and sometimes transmission, brake or other car system) operations based on data received from various sensors 110. Examples of these operations may include an electronic brake control module (EBCM), an engine control module (ECM), a power train control module (PCM) or a vehicle control module (VCM).

Figure 2:
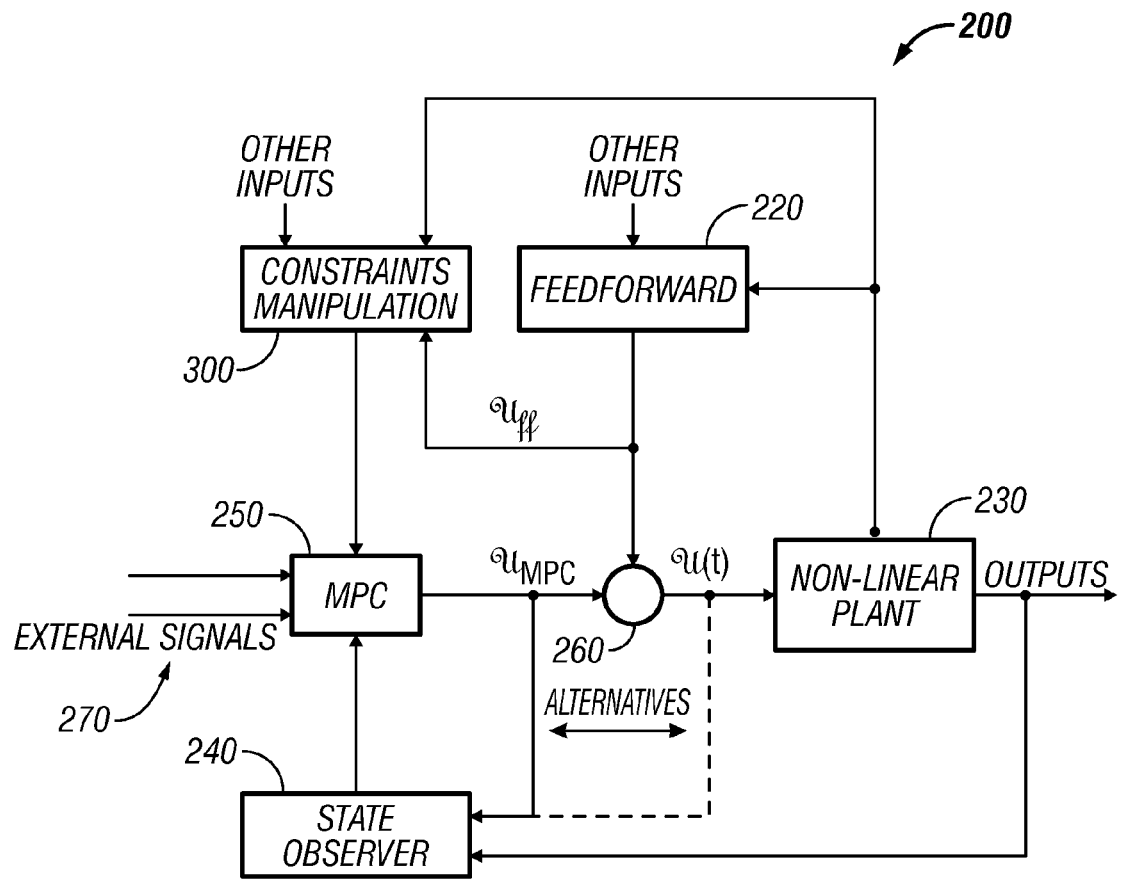
FIG. 2 illustrates a schematic block diagram of a model-based predictive control system with the feedback and feedforward control, in accordance with a preferred embodiment.

The MPC control module 200 can further provide predictive control signals to the system 100, which may be subjected to constraints in control variables and measured output variables. The predictive control signals can be generated by determining the state of actuators 130 and sensors 110 utilizing a state observer 240 in the MPC controller 200, as shown in FIG. 2. The actuators 130 and the sensors 110 can be directly interconnected with a physical plant, such as the engine 120. The information of the engine 120 may be obtained from various sensors 110 on the engine 120 which are connected to a sensor signal processor 140. Control signals, processed in conjunction with data from the MPC control module 200, may be sent to an actuator signal processor 150 which provides control signals in a format for appropriate operation of various actuators 130 on the engine 120 for control of various parameters.

Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

It can be appreciated by those skilled in the art that the methodology described herein can be implemented, at least in some aspects, in the context of a program product (i.e., computer program product) composed of one or more modules. The term "module" as utilized herein can refer to a software module. In the computer programming arts, a "module" can be implemented as a collection of routines and data structures that performs particular tasks or implements a particular abstract data type. Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

FIG. 2 illustrates a schematic block diagram of the model-based predictive control system 200 with a feedback control 250 and a feedforward control 220, in accordance with a preferred embodiment. Note that in FIGS. 1-7, identical or similar blocks are generally indicated by identical reference numerals. The control system 200 generally includes a feedback linear MPC 250, a state observer 240, the feedforward control 220, and a constraint manipulation module 300. The model-based predictive control system 200 can be utilized to control a non-linear plant 230 in combination with a "gain scheduling" approach efficiently. The feedback linear MPC 250 can predict the future behavior of the system 200 for a set of actuators associated with the non-linear plant 230 and formulates the control problem as a constrained optimization. Note that the optimization can be a mathematical programming problem for which efficient methods can be developed. The MPC 250 can receive external signals 270 such as references, constraints, etc for predicting the future behavior of the control system.

The feedforward control 220 can generate a feedforward signal $\mu_{ff}$, which is more accurate and reliable and can be utilized in association with a feedback signal $\mu_{MPC}$. Note that the feedforward signal $\mu_{ff}$ can be externally computed by a nonlinear function or a look-up table. The relations between the system parameters can be determined in order to compute the feedforward signals $\mu_{ff}$ for a set of actuators in the on-line part of the control system 200. A state observer 240 can be configured as an unknown input observer to estimate the effect of the feedforward signal $\mu_{ff}$. The strategy for manipulating the constraints of the feedback MPC 250 utilizing the constraint manipulation module 300 can be implemented.

The control system 200 can enable integration of the feedforward signal $\mu_{ff}$ into a standard feedback signal $\mu_{MPC}$ generated by the feedback MPC 250 utilizing a summer 260. The signals $\mu_{ff}$ and $\mu_{MPC}$ can be summed at the summer 260 to generate a control action $\mu$ for the non-linear plant 230. The feedforward signal $\mu_{ff}$ improves the properties of the feedback MPC 250 especially when controlling the nonlinear plant 230 by the linear MPC 250. The feedforward signal $\mu_{ff}$ can be utilized to speed up the control system 200 during transients caused by external disturbance signals (e.g., automotive control systems, diesel engines, etc.).

The feedforward signal $\mu_{ff}$ is usually a (non-linear) function of a set of process parameters or exogenous variables and is added directly to the standard feedback signal $\mu_{MPC}$ generated by the feedback MPC 250. The constraint manipulation module 300 receives feedforward signal $\mu_{ff}$ along with a feedback from the non-linear plant 230 in order to ensure constraints satisfaction for the non-linear plant 230. Note that the feedforward control 220 and the constraints manipulation module 300 also receive other inputs from the sensors 110.

The combined feedback and feedforward control 250 and 220 can be utilized in a large number of applications and especially in applications when the non-linearity of the system 200 is significant and the (linear) feedback controller 250 is not able to handle the nonlinear behavior efficiently. The feedforward control 220 can be utilized, for example, in automotive control related problems, particularly in the engine control system 100.

The control system 200 achieves reasonable performances to satisfy prescribed time-varying constraints on individual quantities and variables in the system (e.g. emission limits, actuator positions, etc.).

The state observer 240 provides an estimated system state and disturbances based on the feedback model based predictive control signal $\mu_{MPC}$ and the control action $\mu$. In the preferred embodiment, the state observer 240 can be configured as the unknown input observer in order to estimate the effect of the feedforward signal $\mu_{ff}$. The state observer 240 generally receives present and/or past values for a number of inputs from the sensors 110, a number of control outputs, and a number of internal variables from the actuators 130 associated with the non-linear plant 230.

Figure 3:
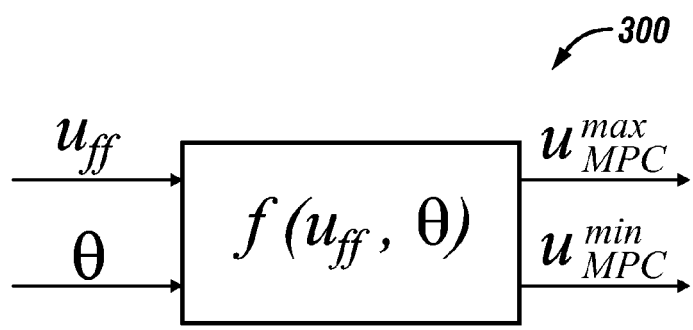
FIG. 3 illustrates a block diagram of the constraints manipulation algorithm associated with the model-based predictive control system, in accordance with a preferred embodiment.

FIG. 3 illustrates a block diagram of the constraints manipulation module 300 associated with the model-based predictive control system 200, in accordance with a preferred embodiment. The constraints manipulation module 300 can provide limitations on particular operating variables or conditions that affect the achievable production rate of the non-linear plant 230. The constraints manipulation module 300 can provide a wide variety of constraints for the non-linear system 230 such as, for example, but not limited to, safety constraints, equipment constraints, equipment availability constraints, supply chain constraints, etc. The strategy for manipulating the constraints for feedback portion of the controller 250 by the constraint manipulation module 300 can be generally expressed as a function $f(\mu_{ff}, \theta)$.

The function $f(\mu_{ff}, \theta)$ represents several relevant parameters such as, for example, feedforward signals $\mu_{ff}$ engine speed, fuel injection, etc., wherein $\theta$ represents a group of relevant parameters such as engine speed, fuel injection quantity, other engine measured physical parameters or parameters specifying reference, constraints signals, etc. The function $f(\mu_{ff}, \theta)$ can generate maximum feedback signal $\mu^{MAX}_{MPC}$ and minimum feedback signal $\mu^{MIN}_{MPC}$ limits. The outputs $\mu^{MAX}_{MPC}$ and $\mu^{MIN}_{MPC}$ of the function $f(\mu_{ff}, \theta)$ of the strategy for manipulating the constraints are directly the limits for the feedback portion 250 of the control signal $\mu_{MPC}$. Hence, the resulting combination $\mu$ of the feedback control signal $\mu_{MPC}$ and the feedforward signal $\mu_{ff}$ does not violate the prescribed time-varying constraints of the actuators 130 associated with the non-linear plant 230. Note that system output constraints and other constraints satisfaction is ensured by the feedback portion generated by the MPC controller.

The constraints for feedback portion 250 can be computed in such a way that the feedforward signal $\mu_{ff}$ dominates in all hard situations when the model uncertainty can cause unacceptable performances of the feedback portion 250 such as, for example, during large transients when the system 200 is going over a number of operating points with significantly different behavior caused by nonlinearities, etc. The feedback portion 250 can dominate in situations when the model uncertainty is not significant, e.g., in the system steady state or during relatively slow transients.

Figure 4:
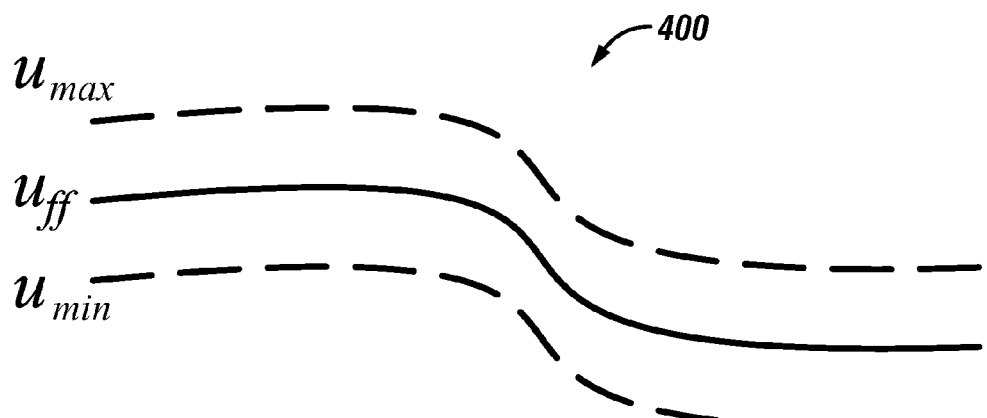
FIG. 4 illustrates a graph depicting constant values of constraint envelope for $\mu(t)$, in accordance with an embodiment.
Figure 5:
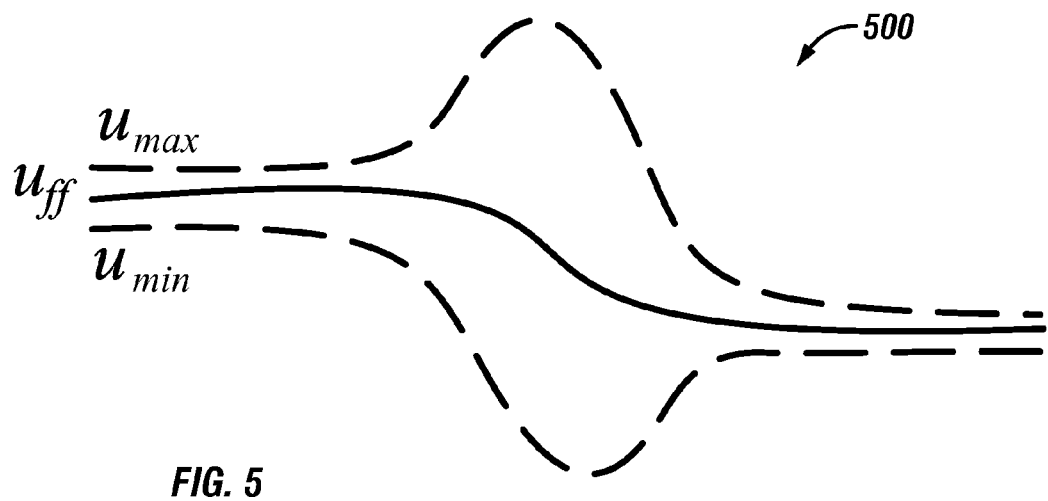
FIG. 5 illustrates a graph depicting wider excursions of $\mu(t)$ when the system is in a transient state, in accordance with an embodiment.

The strategy for manipulating the constraints can be implemented by utilizing a variety of suitable shapes (or envelops). FIG. 4 illustrates a graph 400 depicting constant values of constraint envelope for $\mu$, in accordance with an embodiment. FIG. 5 illustrates a graph 500 depicting wider excursions of $\mu$ when the system 200 is in a transient state, in accordance with an embodiment. The feedback portion $\mu_{MPC}$ is closed in transients and open in steady state.

Figure 6:
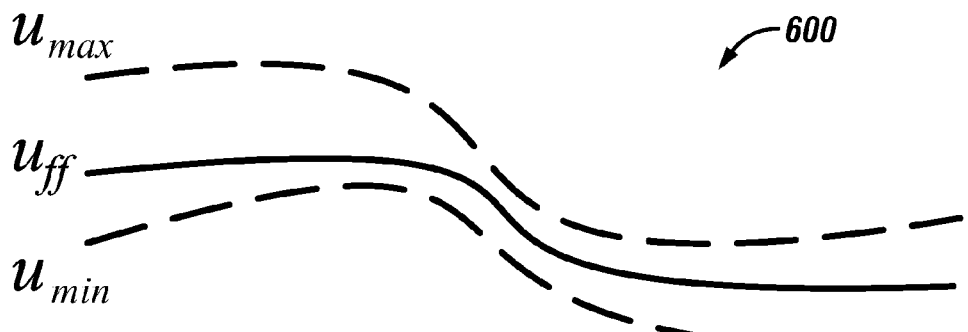
FIG. 6 illustrates a graph depicting narrower band imposed on $\mu(t)$ when the system is in a transient state, in accordance with an embodiment.

FIG. 6 illustrates a graph 600 depicting narrower band imposed on $\mu$ when the system 200 is in a transient state, in accordance with an embodiment. The feedback portion $\mu_{MPC}$ is closed during transients and open in steady state. The decision on which of the strategies for manipulation of constraints is suitable can depend, for example, on properties of the nonlinear plant 230 under control, a possibility of the closed loop system becoming unstable at a specific location in the state space and design requirements on optimality for behavior of the system 200 while in transients. The condition for the graphical representation 400, 500 and 600 can be expressed as follows:

$$\mu_{min} \leq \mu_{MPC} + \mu_{ff} \leq \mu_{max} \quad (1)$$

Additionally, two additional constraints on $\mu_{MPC}$ signal generated by MPC controller 250 can be implemented in order not to violate actuators hard limits and avoid actuator saturation. The constraints on $\mu_{MPC}$ can be denoted as $C_{min}$ and $C_{max}$ and the condition can be expressed as follows.

$$-C_{min} \leq \mu_{MPC} \leq C_{max} \quad (2)$$

The hard limits of actuators can be denoted as $H_{min}$ and $H_{max}$ and the condition can be expressed as follows.

$$H_{min} \leq \mu_{MPC} + \mu_{ff} \leq H_{max} \quad (3)$$

Also, assuming that $H_{min} \leq \mu_{ff} \leq H_{max}$, the following equations (4) and (5) must be satisfied:

$$C_{min} \leq \mu_{ff} - H_{min} \quad (4)$$

$$C_{max} \leq H_{max} - \mu_{ff} \quad (5)$$

Hence, the outputs of the strategy function $f(\mu_{ff}, \theta)$ must satisfy the conditions expressed as follows:

$$\mu_{MPC}^{max} \leq C_{max} \quad (6)$$

$$\mu_{MPC}^{min} \leq C_{min} \quad (7)$$

wherein $C_{max}, C_{min}, \mu_{MPC}^{max}, \mu_{MPC}^{min} \in R^+$

The resulting constraints for feedback portion $\mu_{MPC}$ generated by the MPC controller 250 are given by (8).

$$-\mu_{MPC}^{min} \leq \mu_{MPC} \leq \mu_{MPC}^{max} \quad (8)$$

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 7:
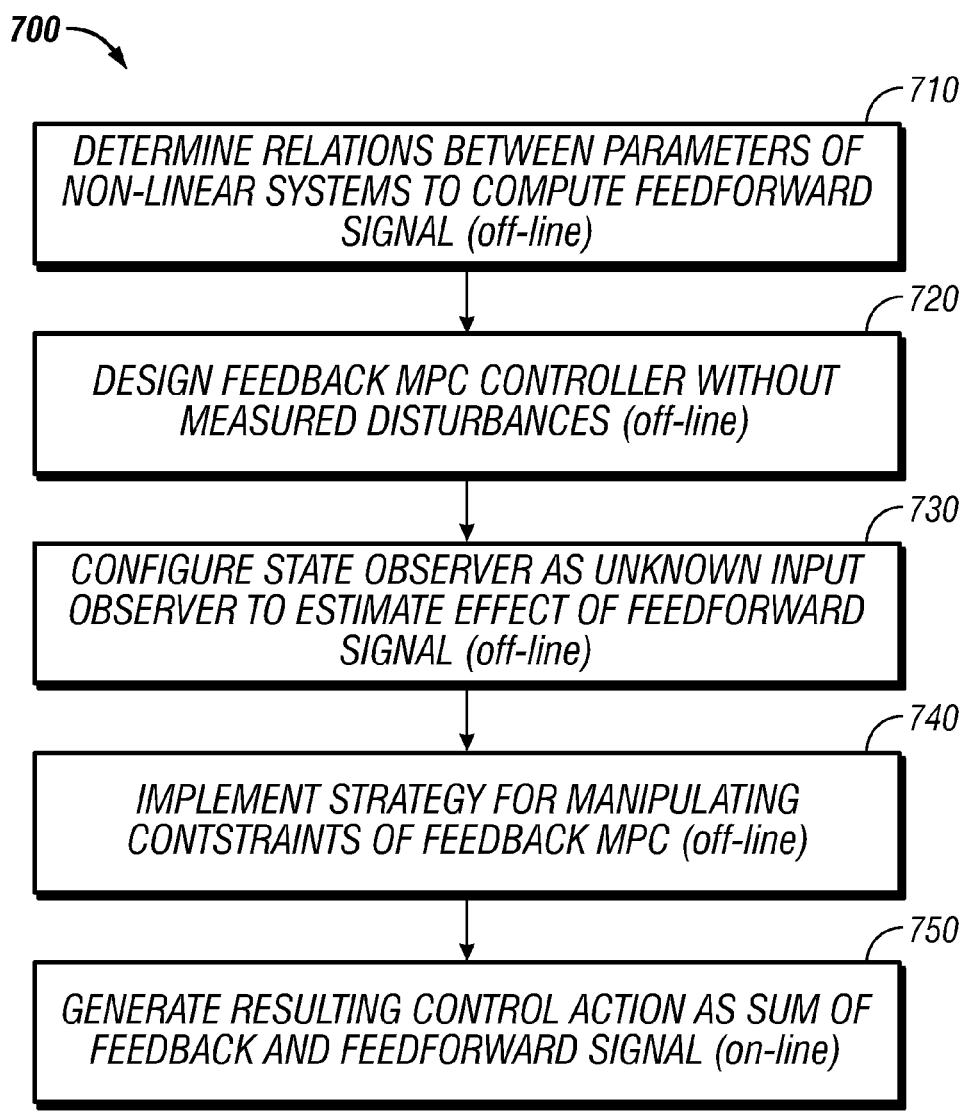
FIG. 7 illustrates a high level flow chart of operation illustrating logical operational steps of a method for combining the feedforward and the feedback control in the model-based predictive control system, in accordance with a preferred embodiment.

FIG. 7 illustrates a high level flow chart of operation illustrating a method 700 for combining the feedforward and the feedback control 220 and 250 in the model-based predictive control system 200, in accordance with a preferred embodiment. The method 700 can be implemented as a software module as a part of the control system 100, as depicted in FIG. 1. The method 700 can be utilized in various real time applications such as, for example, in automotive or aerospace control systems where the computation resources (e.g. CPU and memory) are limited.

The relations between the parameters of the non-linear plant 230 can be initially found in the off-line part in order to compute the feedforward signals $\mu_{ff}$ for the set of actuators in a real-time or on-line part of control, as illustrated at block 710. Thereafter, as depicted at block 720, the feedback MPC controller 250 can be designed without including the parameters and variables that parameterize the feedforward signals $\mu_{ff}$ as measured disturbances in the MPC control system 200.

The state observer 240 can then be configured as unknown input observer in order to estimate the effect of the feedforward signal $\mu_{ff}$, as illustrated at block 730. The feedforward signal may be utilized to define the trajectory along which the MPC model is linearized. The unknown disturbance portion of the model in the state observer 240 can be configured so that the feedforward signals $\mu_{ff}$ are estimated as unknown disturbances. Note that the unknown input observer can be implemented as a part of the system state observer 240 which can be, for example, a Kalman filter.

The strategy for manipulating the constraints of the feedback model based predictive control $\mu_{MPC}$ can be implemented, as depicted at block 740. The resulting control action $\mu$ for the actuator can be provided as a sum of corresponding feedback model based predictive control signal $\mu_{MPC}$ and the feedforward portion $\mu_{ff}$, as indicated at block 750. The control action $\mu$ can be defined by the following equation (9):

$$u = u_{MPC} + u_{ff} \quad (9)$$

The method and system described herein utilizes the externally computed feedforward $\mu_{ff}$ that are more accurate and reliable. In some applications, for example, the steady-state relations in the control system 200 are well known or can be simply estimated from the identification experiments.

Note that in some embodiments, for example, the various logical operational steps of method 700 may be implemented as instructions in the context of a computer-useable medium that contains a program product (as discussed earlier). Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions of method 700 that direct method functions of the present invention, may represent alternative embodiments of the present invention.

Further, it is understood that the present invention may be implemented by a system having components or modules in the form of hardware, software, or a combination of software and hardware as described herein or their equivalent. Thus, the methodology described herein with respect to FIGS. 1-7 and instructions thereof can be deployed as process software in the context of a computer system or data-processing apparatus and/or system.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for integrating a feedforward control into a feedback model-based predictive controller, said method comprising:
    determining a relation between parameters with respect to a non-linear system to compute a feedforward signal for at least one actuator associated with said non-linear system;
    manipulating a plurality of constraints with respect to a model-based predictive feedback controller as a function of a feedforward signal, wherein the plurality of constraints include a constraint envelope that is defined about and is a function of the feedforward signal;
    generating a control action as a sum of a feedback signal and said feedforward signal; and
    transmitting said control action to said at least one actuator associated with said non-linear system, wherein said feedback signal in association with said feedforward signal minimize an effect of uncertainty with respect to disturbances.

2. The method of claim 1 further comprising configuring said model-based predictive feedback controller with measured signals as measured disturbances that parameterize said feedforward signal.

3. The method of claim 1 further comprising configuring a state observer as an unknown input observer to estimate an effect of said feedforward signal to be utilized in concert with said model-based predictive feedback controller.

4. The method of claim 1 wherein said feedforward signal comprises a nonlinear function.

5. The method of claim 1 further comprising utilizing a dynamic filter to improve said feedforward signal and achieve an enhanced transient response with respect to said non-linear system.

6. The method of claim 1 further comprising manipulating said plurality of constraints in order to limit an actuator signal associated with said control action so that said control action does not violate a prescribed time-varying constraint with respect to said at least one actuator.

7. The method of claim 1 further comprising estimating said feedforward signal as an unknown disturbance by an unknown input observer.

8. The method of claim 7 further comprising implementing said unknown input observer as a part of a system state observer.

9. The method of claim 7 wherein said unknown input observer comprises a Kalman filter.

10. The method of claim 1 wherein said manipulating said plurality of constraints is expressed as a function of a plurality of relevant parameters.

11. The method of claim 1 wherein said model-based predictive feedback controller comprises a plant model linearized along a trajectory defined by said feedforward signal.

12. The method of claim 1 further comprising manipulating said plurality of constraints in order to limit said feedback signal associated with said control action so that said control action does not violate a prescribed time-varying constraints with respect to said measurements thereof.

13. A method for integrating a feedforward control into a feedback model-based predictive controller, said method comprising:
 determining a relation between parameters with respect to a non-linear system in order to compute a feedforward signal for at least one actuator associated with said non-linear system
 manipulating a plurality of constraints with respect to a model-based predictive feedback controller as a function of the feedforward signal, said feedforward signal comprising a non-linear function, wherein the plurality of constraints include a constraint envelope that is a function of the feedforward signal;
 generating a control action as a sum of a feedback signal and said feedforward signal; and transmitting said control action to said at least one actuator associated with said non-linear system, wherein said feedback signal in association with said feedforward signal are configured to reduce an effect of uncertainty with respect to a disturbances.

14. A system for integrating a feedforward control into a feedback model-based predictive controller, said system comprising:
 an input configured to receive information from one or more sensors;
 a controller coupled to said input, the controller configured to:
  determine a relation between parameters with respect to a non-linear system,
  compute a feedforward signal for at least one actuator associated with said non-linear system;
  manipulate a plurality of constraints with respect to a model-based predictive feedback controller as a function of the feedforward signal, wherein the plurality of constraints include a constraint envelope that is defined about the feedforward signal;
  generate a control action as a sum of a feedback signal and said feedforward signal using, at least in part, information received from the one or more sensors; and
 an output coupled to the controller for outputting said control action for reception by said at least one actuator.

15. The system of claim 14 wherein said model-based predictive feedback controller is configured with measured signals as measured disturbances that parameterize said feedforward signal.

16. The system of claim 14 wherein the controller further comprises a state observer configured as an unknown input observer to estimate an effect of said feedforward signal in order to thereby implement a strategy for manipulating a plurality of constraints with respect to a model-based predictive feedback controller.

17. The system of claim 16 wherein:
 said unknown input observer estimates said feedforward signal as an unknown disturbance.

18. The system of claim 14 wherein the controller further comprises a dynamic filter and a state observer, wherein said dynamic filter improves said feedforward signal to achieve an enhanced transient response with respect to said non-linear system.

19. The system of claim 14 wherein said plurality of constraints are manipulated in order to limit an actuator signal associated with said control action so that said control action does not violate a prescribed time-varying constraint with respect to said at least one actuator.

20. The system of claim 14 wherein:
 manipulating said plurality of constraints is expressed as a function of a plurality of relevant parameters; and
 said model-based predictive feedback controller comprises a plant model linearized along a trajectory defined by said feedforward signal.

* * * * *